Nov. 24, 1931.    W. B. DAMSEL    1,833,319
FLEXIBLE PIPE COUPLING
Filed July 25, 1929
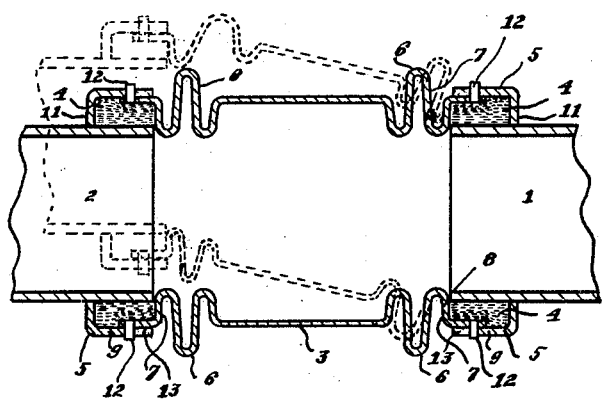
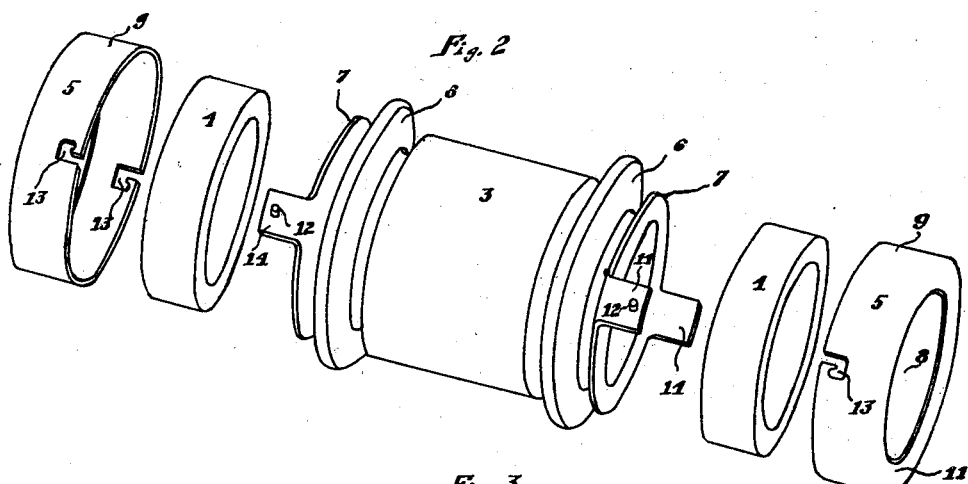
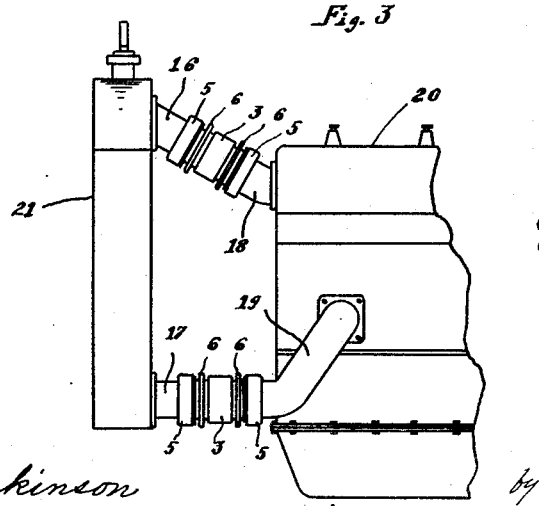
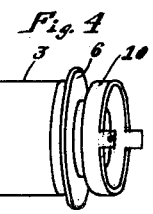
WITNESS!
J. E. Dickinson
INVENTOR
William B. Damsel
by Brown and Critchlow
his Attorneys Patented Nov. 24, 1931

1,833,319

UNITED STATES PATENT OFFICE

WILLIAM B. DAMSEL, OF NEW YORK, N. Y., ASSIGNOR OF ONE-THIRD TO FRED H. BEDFORD, JR., AND ONE-THIRD TO JAMES H. HAYES, BOTH OF NEW YORK, N. Y.

FLEXIBLE PIPE COUPLING

Application filed July 25, 1929. Serial No. 380,830.

This invention relates to pipe couplings, and more particularly to a flexible type of coupling, which while not necessarily so limited, is especially adapted for use in joining smooth ended pipes together.

The object of the invention primarily is to provide a coupling of this character which is simple and sturdy of construction, and which is not deleteriously affected by vibration or longitudinal expansion and contraction of the pipes joined by it.

A further object is to provide a flexible coupling which may be easily and quickly attached to smooth ended pipes without the use of tools or special attaching members, and without necessarily requiring any substantial movement of the pipes which it connects.

These and other objects as well as the novel features and advantages of the invention will become more apparent when the following detailed description is read in conjunction with the accompanying drawings of which Fig. 1 is a vertical section taken longitudinally through a coupling constructed in accordance with the invention, also showing in dotted lines the coupling deflected by the disalignment of one of the pipe; Fig. 2 a perspective view of the coupling showing the various parts detached and arranged in the way they go together; Fig. 3 a view showing two of the couplings connected in the water lines between the engine and radiator of an automobile; and Fig. 4 a fragmentary view showing one end of a modified form of the coupling member.

Referring now to the drawings, and more particularly to Figs. 1 and 2, a pair of smooth ended pipes 1 and 2 are shown connected together by means of a coupling which is the preferred embodiment of the invention. As illustrated, the coupling comprises mainly a longitudinally expansible and transversely flexible coupling member 3, a pair of compressible ring-shaped gaskets 4 and a pair of cup-like end connectors or end caps 5. Coupling member 3, which is arranged between the ends of pipes 1 and 2, is made of some suitable material having flexible characteristics such as brass containing a high percentage of copper. The wall of this tube is made comparatively thin to render it relatively flexible but still sufficiently thick to provide a sturdy coupling. To make it longitudinally expansible and capable of withstanding both longitudinal expansion and contraction as well as vibration of the pipes to which it is connected, annularly disposed corrugations or ribs 6 are formed in the tube and preferably adjacent its ends. Beyond these corrugations at either end of the member there is formed a substantially flat radially disposed flange like rim 7 which engages the inner faces of gaskets 4, and which due to contact therewith substantially prevents the fluid in the pipes contacting with the gaskets.

Gaskets 4 are made in the shape of a band ring with an inner diameter somewhat less than the outer diameter of the pipes with which they are adapted to be used, and of rubber or some other suitable compressible material capable of resisting the action of the fluid passed through the pipes. Due to their inner diameter being less than that of the pipes, the gaskets make fluid-tight contact with the pipes. The outer diameter of the gaskets is slightly greater than the inner diameter of caps 5 so that when the coupling is put together the gaskets are further forced into fluid-tight contact with the pipes as well as more tightly against rims 7. The width of the gaskets is sufficient to insure the proper contact between them and the ends of the pipes and the end 7 on coupling member 3 to prevent leakage in the coupling under any and all conditions to which the coupling may be subjected in its intended service.

The end connectors 5 for holding the coupling together are in the form of flange caps each having an opening 8 slightly larger than the outer diameter of the pipes on which it fits so that it may be easily moved thereon. The annular wall 9 of each cap is preferably slightly narrower than gaskets 4, so that rims 7 will engage the gaskets without striking the ends of the pipes, and its inner diameter is slightly less than that of the outer diameter of the gasket, so that when the caps are forced to place they fit snugly over the gaskets. The flanged ends 11 of the cap abut against the outer ends of the gaskets, and force them tightly against rims 7 thereby insuring contact between the two and also preventing the gaskets from moving away from the ends of coupling member 3.

In order to hold coupling member 3 and each end cap 5 together, and to effect their connection in a simple manner, the connecting member is provided at each end with a pair of radially-projecting pins 12 mounted on axially disposed ears 14, formed in diametric opposition to each other on rims 7, and the cap 5 with a pair of saber notches 13, in which the pins 12 are adapted to fit when the caps are in place. However, the caps may be otherwise attached if desired.

When applying the coupling to the opposed ends of a pair of pipes to join them together, caps 5 are first placed in their proper relation on the ends of the pipes, next the gasket or sealing rings 4 are forced over the ends of the pipes until their inner faces are flush with the ends thereof, and then tubular member 3 is positioned between the ends of the pipes with its ends 7 engaging the inner faces of gaskets 4. Thereafter end caps 5 are forced over gaskets 4, and ears 14 in a telescopic manner with the pins 12 sliding in the notches 13. The connecting members or the end caps 5 are turned sufficiently to engage pins 12 in the saber notches 13 to hold the coupling together.

In Fig. 4 a modified form of coupling 3 is illustrated which is adapted for use on pipes where exceptionally high fluid pressures are encountered. The ends of these couplings are provided with axially disposed rim bands 10 which are adapted to fit over the ends of gaskets 4 instead of radially disposed rims 7 which make contact with only the inner faces of the gaskets. In this form of the coupling the caps 5 fit over both the gaskets 4 and the ends 10 of the coupling member to make a very rigid leak-tight joint.

It will be readily appreciated by those skilled in the art that, due to the compressible qualities of gaskets 4 and the flexible and expansible characteristics of connecting member 3, a coupling is provided which may be employed to advantage for connecting pipes which are subjected to considerable expansion and contraction, as well as vibration.

In Fig. 3 two couplings constructed in accordance with this invention are shown arranged in the cooling system connections between an engine 20 and radiator 21 of an automobile. This is an application for which they are especially adapted, not only because they are able to withstand the severe strains of such service for a much longer time than the old hose form of connections, but also because through their use it is possible to make an all-metal connection between the engine and radiator. In the drawings metal connecting pipes 16 and 17, and 18 and 19 are arranged, respectively, in the radiator and engine, and joined together by couplings embodying this invention. In addition to the advantage incident to the all metal structure of this form of coupling, it may be attached with much greater ease than the older form of connections because the connecting member 3 can be compressed so as to permit its being positioned without requiring any appreciable movement of the pipes, and the end caps then moved to place without the use of any special tools or connecting members.

The coupling requires no cement or other sealing material to make it leak-tight, and it is not impaired by vibration or longitudinal expansion and contraction of the pipes. For special uses, such as in automobile cooling systems, the coupling may have gaskets highly resistant to action of water and anti-freeze compositions, alcohol, etc. When the coupling becomes worn it can be readily and quickly conditioned by simply replacing the gaskets at the ends of the pipes.

According to the provisions of the patent statutes, I have explained the principle and operation of my invention, and have illustrated and described what I now consider to be its best embodiment. However, I desire to have it understood that, within the scope of the appended claim, the invention may be practiced otherwise than as specifically illustrated and described.

I claim:

The combination with two pipes having their ends arranged adjacent to each other, of a pair of compressible annular gaskets fitted in a seal-tight manner over the ends of said pipes, a longitudinally expansible and transversely flexible metallic tube member having a diameter substantially equal to the diameter of said pipes and radially disposed rims on its opposite ends arranged between the ends of the pipes with its end rims tightly contacting with the inner faces of the gaskets, and a pair of end caps provided with saber notches for holding the coupling together fitted over said gaskets and the ends of said tube member in a telescopic fashion, the rim ends of said coupling member being provided with axially disposed ears bearing radially disposed pins for engaging the notches in said end caps.

In testimony whereof, I sign my name.

WILLIAM B. DAMSEL.